United States Patent [19]
Solomon et al.

[11] Patent Number: 5,495,828
[45] Date of Patent: Mar. 5, 1996

[54] ANIMAL BOOTS WITH DETACHABLE, VERTICALLY ADJUSTABLE FASTENING STRAP

[76] Inventors: Irving Solomon; Phyllis Solomon, both of 7850 W. McNab Rd., #116, Tamarac, Fla. 33321

[21] Appl. No.: 269,207

[22] Filed: Jun. 30, 1994

[51] Int. Cl.⁶ .............................. A01K 13/00; A61D 9/00
[52] U.S. Cl. .............................................. 119/850; 36/111
[58] Field of Search ............................ 119/850, 851; 54/82, 79.1, 79.2; 36/111, 162, 87; 2/20, 21, 158; 168/1, 18

[56] References Cited

U.S. PATENT DOCUMENTS

| | | | |
|---|---|---|---|
| 3,026,636 | 3/1962 | Slade | 168/18 |
| 3,135,966 | 6/1964 | Higgins | 2/158 |
| 3,229,690 | 1/1966 | Scholl | 2/158 |
| 3,747,565 | 7/1973 | Kellam | 36/111 |
| 3,762,073 | 10/1973 | Cantales | 36/111 |
| 4,543,911 | 10/1985 | Marshall | 36/111 |
| 4,744,333 | 5/1988 | Taylor | 119/850 |

FOREIGN PATENT DOCUMENTS

| | | | |
|---|---|---|---|
| 2201325 | 9/1988 | United Kingdom | 54/82 |

*Primary Examiner*—Todd E. Manahan
*Attorney, Agent, or Firm*—Malin, Haley, DiMaggio & Crosby

[57] ABSTRACT

A pet animal boot including a pliable sleeve defined by substantially symmetrical side panels that are integrally formed to define a stitchless sleeve wherein the stitchless sleeve defines an open top end and a closed lower end, substantially conforms to the animal's paw and lower leg, contains an interior fabric liner, and is manufactured from a waterproof, non-slip, flexible and durable polymer solution. An adjustable fastening strap is included for securing the boot to an animal's leg. The sleeve is manufactured by dipping a liner into a polymer solution which adheres to the liner through heat curing so as to form a stitchless and seamless boot.

16 Claims, 2 Drawing Sheets

ANIMAL BOOTS WITH DETACHABLE, VERTICALLY ADJUSTABLE FASTENING STRAP

BACKGROUND OF THE INVENTION

1. Field of the Invention

The present invention relates generally to protective paw wear for pet animals, such as dogs and cats, and more particularly to protective pet boots formed from a durable, stitchless and waterproof sleeve which flexibly conforms to the lower leg and paws providing a comfortable fit so the pet may move more naturally without being compelled to remove the boots.

2. Description of the Background Art

Dog and cat owners have long been concerned with protecting their pet's paws from harsh weather conditions and sharp debris found outdoors, especially when their pets have existing injuries. For instance, during the winter months snow and ice melting chemicals, such as salt, burn and aggravate an animal's paw and often produce infections in open wounds. Meanwhile, in the summertime scorching hot concrete and sand also causes great discomfort especially if the animal has cuts and abrasions. In addition, regardless of the weather, pets are always susceptible to paw and lower leg injuries from glass, sharp rocks, burrs, thorns and other sharp debris which have a tendency to penetrate and fester in the paw area. Animal boots for dogs can prevent and protect against these noted injuries and discomforts however nothing currently exist which is tolerant to the noted outdoor conditions.

To be effective, animal boots should be waterproof, conforming and naturally comfortable for the pet. Boots that are not waterproof allow chemical brine, a solution produced by the combination of melted ice and salt-like chemicals, to collect inside the boot resulting in irritation and possibly infection to the paw and lower leg. Such a result is precisely what the boot is meant to avoid. On the other hand, if the boots are too stiff and cut off circulation such that they do not allow the pet animals to walk, run or move about freely the boots will only be removed, negating the protective purpose.

Several boots exist in the background art, none of which provide a comfortable and practical water proof boot as contemplated by the present invention. Some of the boots known resemble human shoes, whereby an upper canvas is sewn to a lower sole section. Dog and cat paws, however, are anatomically distinct in shape, angular position and bending movement compared to the human foot making these similarly designed shoes too rigid and restricting for natural and practical pet use. In addition, animal boots which require or employ stitching allow chemical brine and water to penetrate the boot through stitched seams so that the paw is saturated compounding irritation and infection. Even the boots that are designed with water repellant material present problems because the material is typically stitched together leaving porous seams. Sinclair, U.S. Pat. No. 4,458,431, discloses such a boot for pet animals comprising an adjustable paw covering upper which is stitched to a sole pad lower. Although the boot upper is formed from an umbrella like material, it is stitched to the sole member leaving an exposed porous seam. Meanwhile, Marshall, U.S. Pat. No. 4,457,261 discloses water-repellant canine mittens stitched together from a rectangular piece of light weight material which has a non-slip grip on the outside and includes a self-gripping material stitched to the mitten near the top for securing around a dog's leg. The mitten is typically made from a water-repellant latex material that is generally less than 0.02 inches thick to bend and ply with the paws' movement. While this latex material is meant to be water-repellant, it is not intended to protect the dog's paws against sharp objects and accordingly may be punctured so as to allow the penetration of water. By contrast, the present invention provides a seamless, water-proof, flexible boot fabricated from a durable heat cured PVC material that conforms to the pet's leg so the pet animal may move naturally and unencumbered while receiving protection from ice, snow, rain, chemical brine and sharp objects. In addition, the present invention does not require additional grip enhancers as it is manufactured from materials which naturally grip surfaces.

The above noted background art neither solves or addresses the problems contemplated by the present invention. Therefore, there remains a need for a dog boot capable of preventing injuries to the animal's paws which are typically caused by ice melting chemicals used in thawing streets, broken glass and other sharp debris. The present invention solves these problems by providing a water repellent, flexible, seamless boot which is naturally and comfortably worn by dogs and cats alike for protecting their paws from outdoor conditions. Moreover, the present invention is useful for concealing the paw after surgery to accelerate the healing process and to protect the paws and lower legs of show dogs.

SUMMARY OF THE INVENTION

It is an object of the present invention to provide an animal boot that is sufficiently flexible for conforming to the animal's paw and lower leg, durable for protecting against puncture wounds and water-proof for concealing the paws from snow, ice. rain and chemical salts used in thawing streets during the winter.

It is another object of the invention to provide an animal boot that is flexible, durable and water-proof which provides a comfortable unencumbered fit so that the animal may walk and run naturally without wanting to remove the boots.

It's also an object of this invention to provide an animal boot that does not require any exterior stitching or that does not leave any seams or stitching exposed making the boot completely non-porous for effectuating a water-proof wear.

It is still another object of the invention to provide a flexible, durable and water-proof animal boot that may be used by veterinarians or pet owners to protect an animal's paws and lower legs after an injury or surgery to accelerate the healing process by eliminating the dog's access to the wound.

It is yet another object of the invention to provide a flexible, durable, and water-proof animal boot that may be used to protect the paws and lower legs of show dogs so as to not jeopardize their health and appearance.

In accordance with these and other objects, the present invention comprises an animal boot that is fabricated from a non-porous water repellent material that is sufficiently flexible to allow natural movement for the animal while being durable enough to prevent injuries. In addition, the boot is designed to provide a flat, easily flexible boot with a wide flared opening to facilitate easier paw insertion. The present invention is intended to provide complete protection and flexible comfort for pets, particularly dogs, whereby the flexible boot design may prove beneficial for guide dogs, police department canine, show dogs and regular pets where the owners require reliability and performance of a product which is comfortable for their pets. Moreover, since dogs often have a tendency to remove any type of clothing or footwear, the animal boot facilitates a comfortable flared sleeve design that defines a spacious volume so the paw can spread to afford the dog natural, unencumbered movement.

The present animal boot comprises a paddle-shaped boot or sleeve having a shape that makes it easier to put on the dog's paw and a uniform, continuous exterior surface such that there are no exposed stitch seams for allowing water into the boot. Since dogs tend to resist being dressed the sleeve is also substantially straight, flat and elongated with a flared top end to permit easier paw insertion. Another important feature is that the boot flexibly conforms to the animal's paw and lower leg although it appears paddle-shaped and flat when not worn.

The boot comprises a flexible sleeve having a front and back side which are identical and symmetrical in shape so that the surfaces may be alternated between top and bottom for increasing the longevity of the boot's use. The sleeve or boot defines an open top end which flares outward for providing a wider opening adaptable for easier insertion on the dog's paw. Meanwhile, the lower end of the paddle-shaped boot is substantially curved and broad to provide enough room and clearance for the animal's paws so that the animal feels as though any movement is natural. The lower rounded end and the open top end are joined by a more narrow intermediate waist section which helps to secure the boot to the animal's lower leg while allowing ample space in the sleeve for moving the paws without constriction. Additional security is provided by a fastening system comprising a detachable hook-and-loop strap, such as that found under the trademark Velcro, and a corresponding strip permanently affixed to the boot. The hook-and-loop strap is provided for wrapping around the boot and lower leg to secure the boot on the leg without cutting off the circulation in the dog's leg so that a comfortable, unrestricted fit is achieved. The strap is lined with hook-and-loop for releasably and adjustably attaching to the vertical hook-and-loop strip so that it may be secured in place on the boot. The strip is substantially vertically disposed on the boot and permanently adhered to the outside of the boot by heat welding or heat pressing rather than stitching.

Consequently, the essence of the instant invention is constantly maintained by avoiding any exposed stitching which could let water seep into the boot. The problem found with stitching is that porous seams are left exposed for water to penetrate into the boot defeating any purpose of protecting the paws from adverse environment conditions. The present invention avoids seepage and repels water by manufacturing the boot with a water-proof polymer material, such as flexible vinyl resins, synthetic rubber or latex, by a heat curing process. A material comprising polyvinyl chloride (PVC) is preferred.

An interior liner is also provided inside the boot for achieving complete comfort for the animal. This liner comprises a soft woven fleece fabric sewn together and adhered to the inside of the sleeve. The woven fleece fabric liner is considered to be an improvement over velvet type fabrics wherein it provides increased warmth in cold climates while having properties to eliminate condensation during the summer months. In addition, the woven fleece fabric liner provides a comfortable surface in the event the animal should have a present wound, injury or surgical scar. This allows the wound to heal properly and more quickly as the soft liner is of the type that will not aggravate the wound. Although the interior liner of the animal boot is sewn together along its side edges these seams or stitchings are in no way exposed to the ambient, whereby they are completely sealed in the heat curing process when forming the boot.

BRIEF DESCRIPTION OF THE DRAWINGS

This invention is described in detail below with reference to the accompanying drawings, in which.

DESCRIPTION OF THE PREFERRED EMBODIMENTS

Figures 1, 2:
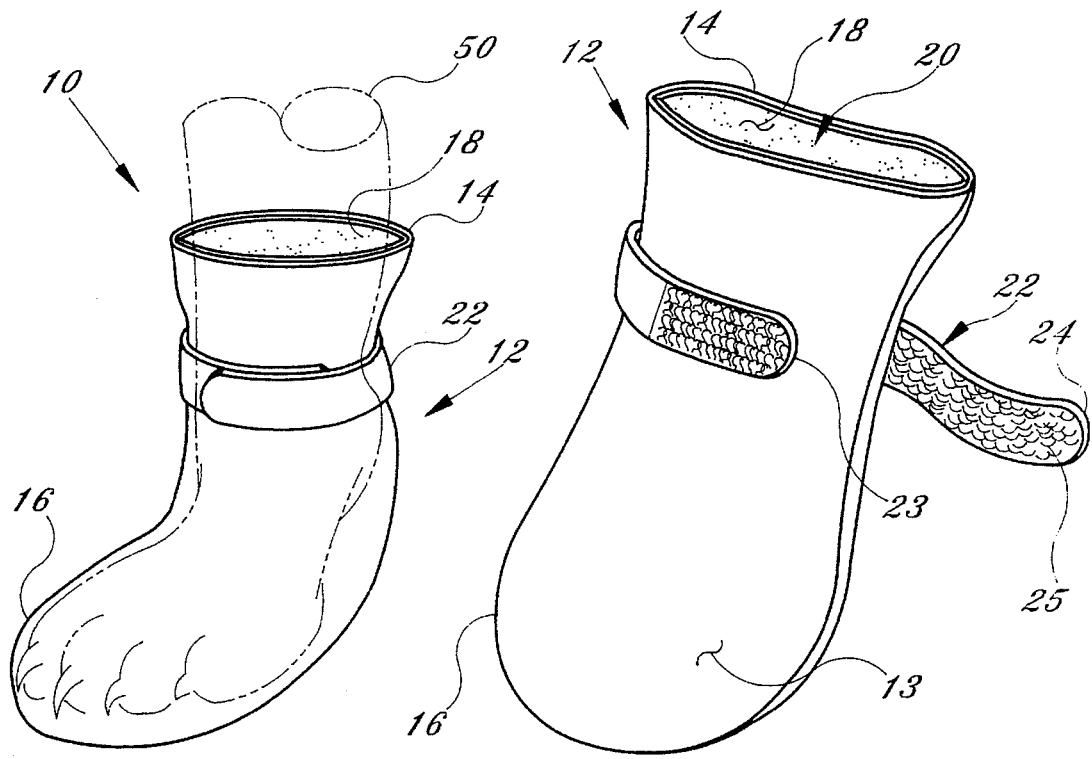
FIG. 1 is a perspective view of a preferred embodiment of the novel animal boot as worn on a dog's leg.
FIG. 2 is a perspective view of the novel animal boot illustrating the securing strap and the boot's shape prior to wearing.
Figure 5:
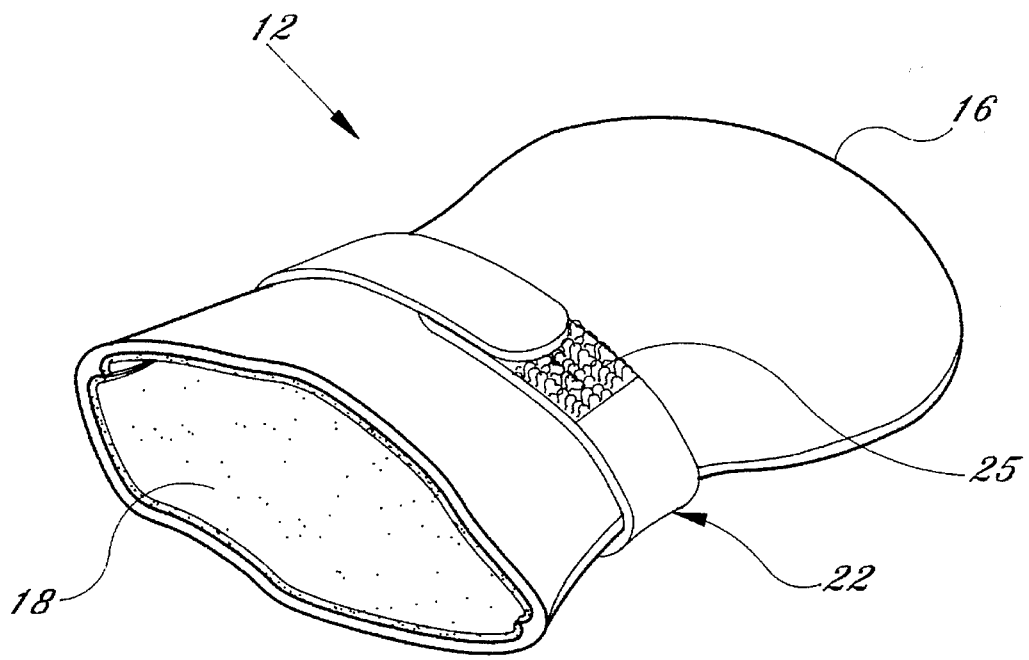
FIG. 5 is a top perspective view of the novel animal boot illustrating the boot's inner volume and fabric liner disposed therein.

FIGS. 1–6 show the preferred embodiment of the novel animal boot 10 worn by the dog to prevent injury or to protect current wounds. Referring to FIG. 1, the boot is mounted on a dog's paw and lower leg 50 to protect the same from sharp objects, snow, ice, thawing chemicals like salt, hot surfaces and other conditions with dangerous propensities. The present invention 10 comprises a sleeve 12 fabricated from a non-porous water-proof material that is sufficiently flexible, yet durable, so as to be easily manipulated for mounting on the paw allowing natural movement while preventing the paw from injuries. The novel animal boot 10 also includes a fabric liner 18 on the interior of the sleeve 12 and a fastening system comprising a detachable strap 22 with loop fasteners and a corresponding strip 30 on the boot's outer surface with hook fasteners. The sleeve is uniform in structure such that the front side 13 and the back side 15 are integrally formed, as seen in FIGS. 1, 2 and 5, leaving no stitching or seams exposed. Thus, the essence of the invention is achieved by providing a non-porous stitchless boot, that is extremely flexible, substantially impenetrable to rocks, glass, thorns, etc. and impervious to the seepage of water and brine. In addition, since the front side 13 and back side 15 are substantially identical and symmetrical, the boot 10 has double wearability whereby the front and back sides 13, 15 may be alternated between the top and bottom of the paw 50.

With reference to FIG. 2, the sleeve 12 is a somewhat flat, but easily flexed, pocket with a flared top end 14 affording a wide opening for easier paw insertion. The bottom or lower end 16 of sleeve 12 is a rounded, closed end which protects the paw. Ample volume 20 is defined by the sleeve 12, especially at the lower end to give the paw freedom to spread or move. Thus, the combination of flexibility inherent in the sleeve 12 and the spacious volume 20, proximal the closed end 16, let the dog walk, run and move naturally alleviating any tendency the dog may have to remove the animal boot.

It should also be noted that the boot 10 may be fabricated in varying sizes to accommodate a variety of dogs, or cats.

Figures 3, 4:
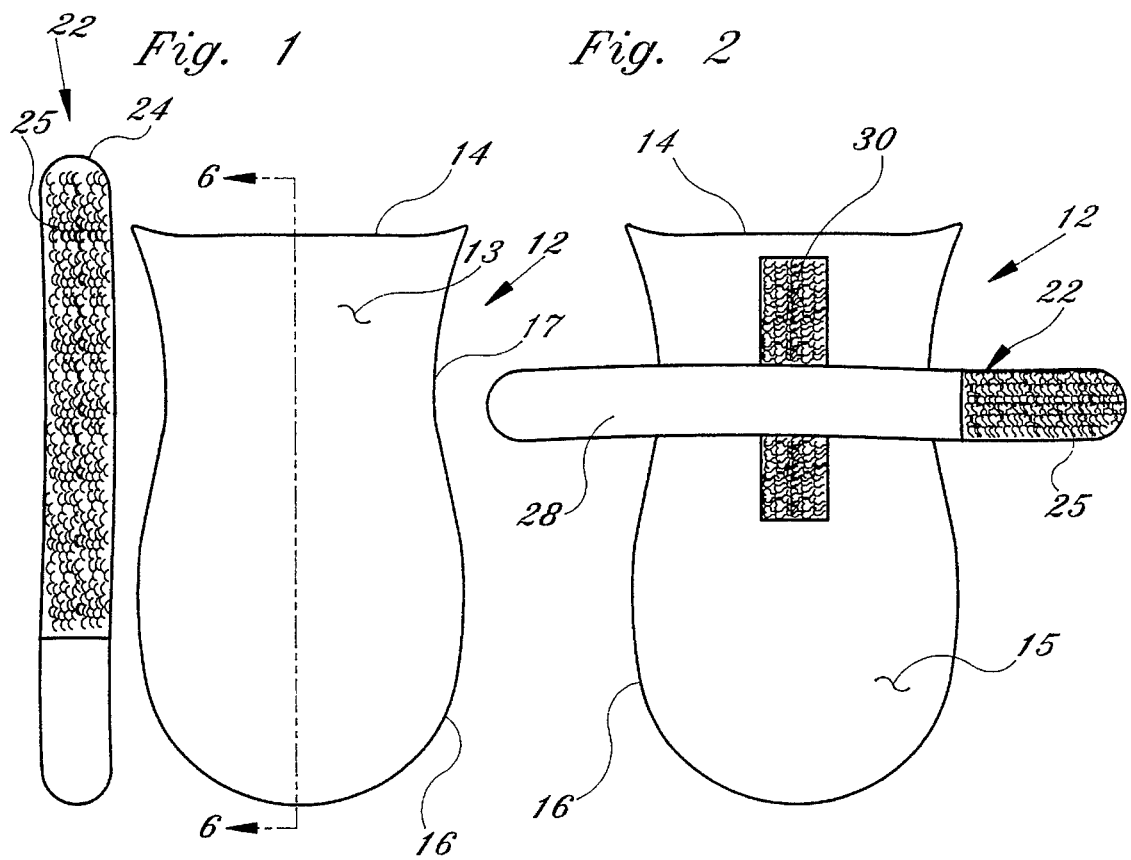
FIG. 3 is a front elevational view of the novel animal boot illustrating the boot's flared shape and the securing strap detached from the boot with loop liner along the strap's inner surface.
FIG. 4 is a rear elevational view of the novel animal boot illustrating the securing strap releasably attached to the boot's hook strip.

The boot securing and fastening system, as seen in FIGS. 2–4, comprises a detachable securing strap 22 having a first end 23, a second end 24 and an inner surface loop liner 25, and a generally vertical adjusting strip 30 permanently adhered to the sleeve back side 15 for releasably attaching the strap loop liner 25 at various heights. The strip 30 is permanently adhered to the outside of the sleeve 12 by heat welding or heat pressing rather than stitching so as to maintain water proof integrity. The adjusting strip 30 may also be affixed to the front side 13 to meet the objectives of the instant invention. To releasably attach the strap 22 where desired, the vertical strip 30 comprises a hook liner, as is found in hook-and-loop type fasteners. Likewise, the first end 23 of the strap 22 is lined with a hook fastener band 26 to releasably attach the loop liner 25. Of course, any combination of hook-and-loop fastener may be incorporated without departing from the scope of the instant invention.

Referring to FIGS. 3–5, the sleeve 12 comprises a paddle-shaped pocket having an elongated, flared shape that makes it easier to put on the dog's paw and a uniform, continuous exterior surface such that there are no exposed stitch seams for allowing water or brine into the boot. The top end 14 and bottom end 16 or sleeve 12 are joined by an intermediate waist section 17. The intermediate waist section 17 is smaller in width than the top and lower ends 14, 16 to help prevent slipping in conjunction with the fastening system strap 22 previously discussed.

Figure 6:
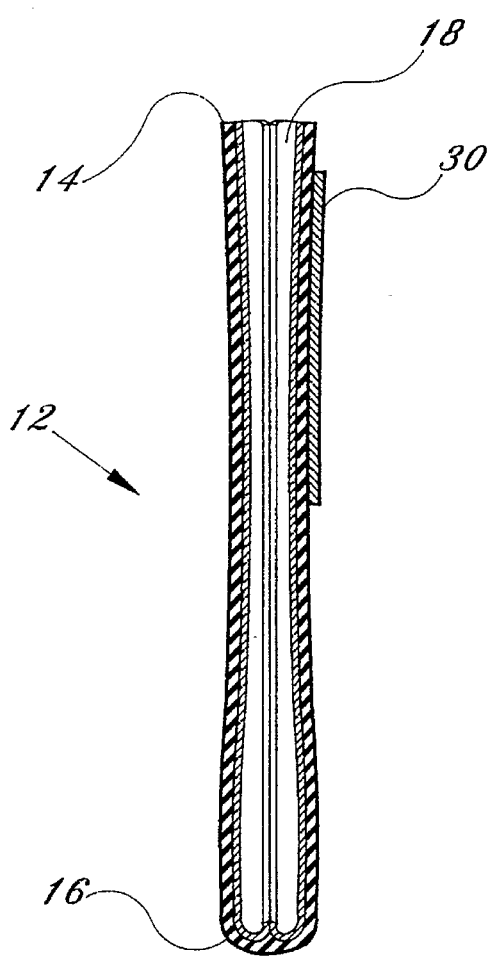
FIG. 6 is a cross-section view of the novel animal boot taken along line 6—6 of FIG. 3, illustrating the interior liner.

A liner 18 is also provided on the inside of the sleeve 12 within volume 20, shown in FIGS. 2, 5 and 6, for achieving complete comfort for the animal. The liner 18 comprises a soft woven fleece fabric sewn together inside the boot or sleeve. The liner 18 may be constructed by taking two paddle shape sections and sewing them together along the bottom and side edges. This liner is preferably prefabricated and used in fabricating the sleeve 12 by dipping it into a heat cured solution containing polyvinyl chloride (PVC) to seal off all seams and perforations, discussed infra. This solution may also comprise latex, rubber or polymer solution. However, the sleeve may be formed first without the liner by dipping a paddle-shaped mold into the solution and then adhering the liner 18 inside the sleeve 12 with adhesives once the sleeve is formed. The liner 18 provides increased warmth in cold climates and has properties to eliminate condensation. In addition, the woven fleece fabric liner 18 provides a comfortable surface in the event the animal should have an injury or wound that has been treated. The liner 18 allows the wound to heal properly and more quickly as the soft liner is of the type that will not aggravate the wound. Moreover, the wound is protected by isolating it from the pet.

The animal boot 10 is manufactured and assembled to achieve a non-porous sleeve 12 with flexibility and durability. The sleeve 12 is preferably manufactured by a heat curing process whereby the liner is dipped into a polymer-type solution, where PVC is the main ingredient, while at its solid-liquid saturation point such that a slight decrease in temperature after dipping automatically begins the solidification of the solution. One such method employed comprises taking two paddle shape sheet of liner fabric which are sewn together at their edges, excluding the top edge, to form a paddle shape sleeve out of the liner 18. To form the actual boot sleeve 12, the liner 18 is placed on a corresponding mold and dipped into a substantially liquid or saturated polymer, such as polyurethane, latex, polyester or foam rubber, or a similar polymer of which PVC is the main ingredient. The polymer solution is cured at high temperatures, such as 375°–450° F., for maintaining it at its saturation point so as to allow it to quickly cool into the molded paddle shape when the temperature is slightly reduced. Cooler temperatures allow it to completely cool and form over a predetermined amount of time. Accordingly, all stitched seams and fabric perforations are sealed by the heat curing process forming the boot. The end result is a tough, durable, rubber-like animal boot that is waterproof and which grips walking surfaces to prevent the animal from slipping.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An animal boot for covering and protecting the paws and lower legs of pet animals from injuries caused by glass, thorns and other sharp objects and from snow, ice and their melting chemicals, said animal boot comprising:

a flexible, stitchless and non-porous sleeve for insertion over an animal's paw and lower leg so as to conform to portions of the animal's paw and lower leg, said sleeve defining a front side and a back side, integrally formed as a single, uniform sleeve, said front and back sides being substantially symmetrical in shape and size;

a fabric liner defining an interior surface of said sleeve, said sleeve permanently and sealingly joined to said liner;

an open top end defined by said sleeve for receiving the animal's paw and wrapping around the animal's lower leg;

a closed end opposite said top end and defined by said sleeve for containing the animal's paw; and a detachable, vertically adjustable fastening strap removably attached to said sleeve for adjustably wrapping around said sleeve to secure said sleeve to the animal's leg, said strap being vertically adjustable along said sleeve.

2. An animal boot as recited in claim 1, wherein said fabric liner and said sleeve are heat-cured together.

3. An animal boot as recited in claim 1 wherein said closed end is substantially curved.

4. An animal boot as recited in claim 3, wherein said closed end defines a volume adapted to be slightly larger than the animal's paw.

5. An animal boot as recited in claim 1, wherein said top end and said closed end are joined by an intermediate section, said intermediate section being of lesser width than said open top end and said closed end for facilitating engagement with the animal's leg.

6. An animal boot as recited in claim 1, further comprising a strap securing strip permanently attached to said sleeve for releasably attaching and securing said strap, said strip being oriented for adjusting said strap vertically along said sleeve.

7. An animal boot as recited in claim 6, wherein said fastening strap and strap securing strip having corresponding hook-and-loop surfaces for releasably attaching said strap to said strip.

8. An animal boot as recited in claim 7, further comprising:

a tapered intermediate section joining said open top end and said closed end, said intermediate section being of lesser width than said open top end and said closed end.

9. An animal boot for covering and protecting the paw and lower leg of a pet dog from injuries caused by glass, thorns and other sharp objects and from snow, ice and their melting chemicals, said animal boot comprising:

- a flexible, stitchless and non-porous sleeve having a single uniform structure for insertion over an animal's paw and lower leg, said sleeve conforming to portions of the paw and the lower leg, said sleeve defining a first side and a back side integrally joined as a single uniform structure, said front and back sides being substantially symmetrical and identical in shape and size;
- said sleeve having an interior surface;
- a fabric liner permanently adhered to said interior surface to provide a soft interior surface;
- an open top end defined by said sleeve for receiving the paw and wrapping around the animal's lower leg;
- a closed end opposite said open top end and defined by said sleeve for containing the animal's paw;
- a tapered intermediate section joining said open top end and said closed end, said intermediate section being of lesser width than said open top end and said closed end; and
- a detachable, vertically adjustable fastening strap removably attached to said sleeve for adjustably wrapping around said sleeve to secure said sleeve to the animal's leg, said strap being vertically adjustable along said sleeve.

10. An animal boot as recited in claim 9 wherein said closed end is substantially curved.

11. An animal boot as recited in claim 10, wherein said closed end defines a volume slightly larger than the paw to allow the paw to spread.

12. An animal boot as recited in claim 11, wherein said sleeve is fabricated from a solution including polyvinyl chloride.

13. An animal boot as recited in claim 11, wherein said fabric liner comprises woven fleece.

14. An animal boot as recited in claim 9, further comprising a strap securing strip permanently attached to said sleeve for releasably attaching and securing said strap, said strip being oriented for adjusting said strap vertically along said sleeve.

15. An animal boot as recited in claim 14, wherein said fastening strap and strap securing strip having corresponding hook-and-loop surfaces for releasably attaching said strap to said strip.

16. An animal boot as recited in claim 15, wherein said fabric liner and said sleeve are heat-cured together.

* * * * *